(12) United States Patent
Matsui et al.

(10) Patent No.: US 9,108,171 B2
(45) Date of Patent: Aug. 18, 2015

(54) METHOD OF MANUFACTURING RESIN KNEADED PRODUCT

(71) Applicant: MITSUBISHI RAYON CO., LTD., Chiyoda-ku (JP)

(72) Inventors: Yuuki Matsui, Otake (JP); Masaaki Kiura, Otake (JP); Shougo Ookubo, Otake (JP); Sadaharu Kawabe, Otake (JP)

(73) Assignee: MITSUBISHI RAYON CO., LTD., Chiyoda-ku (JP)

( * ) Notice: Subject to any disclaimer, the term of this patent is extended or adjusted under 35 U.S.C. 154(b) by 0 days.

(21) Appl. No.: 14/373,467

(22) PCT Filed: Feb. 6, 2013

(86) PCT No.: PCT/JP2013/052708
§ 371 (c)(1),
(2) Date: Jul. 21, 2014

(87) PCT Pub. No.: WO2013/118763
PCT Pub. Date: Aug. 15, 2013

(65) Prior Publication Data
US 2014/0371368 A1    Dec. 18, 2014

(30) Foreign Application Priority Data
Feb. 7, 2012  (JP) ................. 2012-024002

(51) Int. Cl.
| | |
|---|---|
| C08L 33/10 | (2006.01) |
| B01F 7/00 | (2006.01) |
| B29B 7/84 | (2006.01) |
| B29B 7/48 | (2006.01) |
| B29B 7/60 | (2006.01) |
| B29C 47/38 | (2006.01) |
| B29B 7/00 | (2006.01) |
| C08L 23/12 | (2006.01) |
| C08L 25/06 | (2006.01) |
| B29C 47/40 | (2006.01) |
| B29C 47/60 | (2006.01) |
| B29C 47/76 | (2006.01) |
| B29C 47/94 | (2006.01) |
| B29B 9/06 | (2006.01) |

(52) U.S. Cl.
CPC ............ *B01F 7/00975* (2013.01); *B29B 7/002* (2013.01); *B29B 7/482* (2013.01); *B29B 7/603* (2013.01); *B29B 7/84* (2013.01); *B29C 47/38* (2013.01); *C08L 23/12* (2013.01); *C08L 25/06* (2013.01); *C08L 33/10* (2013.01); *B01F 2215/0049* (2013.01); *B29B 9/06* (2013.01); *B29C 47/40* (2013.01); *B29C 47/6056* (2013.01); *B29C 47/766* (2013.01); *B29C 47/94* (2013.01)

(58) Field of Classification Search
CPC .................................................. B01F 7/00975
USPC ........................................................... 524/417
See application file for complete search history.

(56) References Cited

U.S. PATENT DOCUMENTS

| | | | | |
|---|---|---|---|---|
| 3,843,757 | A | * | 10/1974 | Ehrenfreund et al. .......... 264/53 |
| 5,106,564 | A | | 4/1992 | Iwanami et al. |
| 6,220,745 | B1 | | 4/2001 | Kobayashi et al. |
| 6,525,126 | B1 | | 2/2003 | Hattori et al. |
| 2003/0124334 | A1 | * | 7/2003 | Naito et al. ................. 428/314.8 |
| 2007/0260004 | A1 | * | 11/2007 | Zanka et al. ................... 524/451 |

FOREIGN PATENT DOCUMENTS

| | | |
|---|---|---|
| JP | 2 1650 | 1/1990 |
| JP | 3 247435 | 11/1991 |
| JP | 10 34730 | 2/1998 |
| JP | 10 235636 | 9/1998 |
| JP | 2002 47403 | 2/2002 |
| JP | 2008 238626 | 10/2008 |
| JP | 2010 105285 | 5/2010 |
| JP | 2012200931 | 10/2012 |
| WO | 2012/124762 | 9/2012 |

OTHER PUBLICATIONS

International Search Report Issued Mar. 5, 2013 in PCT/JP13/052708 Filed Feb. 6, 2013.
European Search Report as received in the corresponding European Patent Application No. 13747025.8 — 1706 /2813334 (PCT/JP2013052708).

* cited by examiner

*Primary Examiner* — Doris Lee
(74) *Attorney, Agent, or Firm* — Oblon, McClelland, Maier & Neustadt, L.L.P.

(57) ABSTRACT

Provided is a method of manufacturing a resin kneaded product in which an extrusion amount of a material can be increased and by which vent-up at an opening can be suppressed while spouting out of an unmelted material at the opening can be suppressed. A method of manufacturing a resin kneaded product includes kneading a material containing an additive (a) and a thermoplastic resin (b) using a twin screw extruder, in which the twin screw extruder is equipped with a supply port, a discharge port, an opening present between the supply port and the discharge port, a kneading section A present between the supply port and the opening, and a kneading section B present between the opening and the discharge port, a ratio L1 (La/D) of a length La of the kneading section A to a screw diameter D satisfies L1≥3, and the material is kneaded in the kneading section A without being completely filled and the material is also kneaded in the kneading section B.

10 Claims, 1 Drawing Sheet

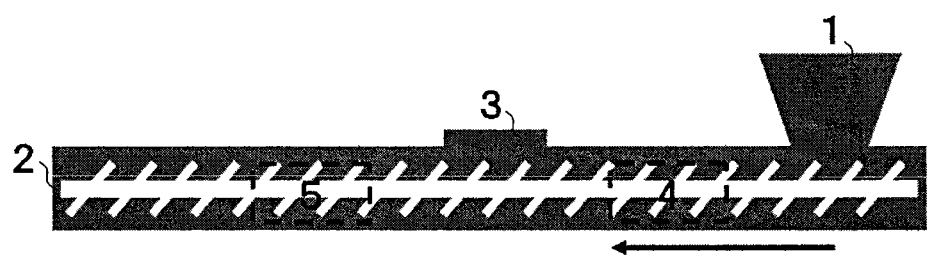

METHOD OF MANUFACTURING RESIN KNEADED PRODUCT

This application is a National Stage of PCT/JP13/052708 filed Feb. 6, 2013 and claims the benefit of JP 2012-024002 filed Feb. 7, 2012.

TECHNICAL FIELD

The present invention relates to a method of manufacturing a resin kneaded product containing an additive.

BACKGROUND ART

In recent years, techniques to melt-knead functional additives have been investigated for the purpose of imparting various functions to various kinds of thermoplastic resins. Many of those functional additives are inorganic fillers or organic additives having a significantly high melting point or decomposition temperature and thus these do not melt at a normal extrusion temperature. It is desirable for such additives which do not melt at the time of extrusion to be in a high dispersion state in order to exert higher performance, and thus the shape thereof tends to be miniaturized, that is, finely pulverized.

A twin screw extruder can favorably mix and disperse many materials and discharge in a stable extrusion amount, and thus is widely used in the manufacture of a resin kneaded product, or the like. However, there are many cases in which the amount of the material entering into the supply section of a twin screw extruder (the amount that enters into a twin screw extruder) limits the extrusion amount when a material containing a large amount of fine powder with a small bulk specific gravity or the like is extruded.

As a method for solving this, a method using a forced supply device (compactor) can be exemplified. However, the effect thereof is not sufficient in the case of a fine powder that is a significantly fine particle, has a small bulk specific gravity, and is easily fluidized although a compactor is used, and thus it is difficult to obtain a desired extrusion amount. As a result, the operation can only be performed in a limited range of extrusion conditions.

The major factor that prevents the entering of the material containing a fine powder into the supply section is a large amount of air contained in the fine powder due to the small bulk specific gravity thereof. This material containing a large amount of air is compressed in a twin screw extruder, air is separated, and the air flows to the supply section side of the twin screw extruder, that is, in a direction opposite to the moving direction of the material. As a result, the fine powder is in a fluidized state within the barrel. For this reason, the apparent friction coefficient of the material decreases, the compression of the fine powder by the screw hardly proceeds, and the original mass transport amount of the screw is reduced as a result. The extrusion action is not lost even in this case since the material is softened by the heat from the barrel and the compression melting proceeds in combination with the shear force caused by the screw. However, the extruder can only exert the ability which is much lower compared to the extrusion amount obtained by compressing and melting the material primarily by the mechanical shear heat which is the original function of a twin screw extruder. As described above, it is likely to occur a phenomenon, so-called feed-neck phenomenon, that the material at the supply port does not enter into the inside of the extruder since the air remains in the inside of the twin screw extruder.

To cope with such a problem, a method is suggested in, for example, Patent Document 1 in which the relative velocity of the fine powder and the air is reduced by not allowing the air contained in the fine powder to flow backward to the supply port of the extruder but releasing the air through the opening provided downstream the supply port and thus the material is extruded without being in the fluidized state.

CITATION LIST

Patent Document

Patent Document 1: JP 02-1650 B

DISCLOSURE OF THE INVENTION

Problem to be Solved by the Invention

However, there is a case in which an unmelted material spouts out from the opening and a case in which the unmelted material does not spout out in the method suggested in Patent Document 1, and thus the optimization of the extrusion conditions is desirable. This is because the material is blown up by the rotation of the screw and the spouting out of the unmelted material through the opening (phenomenon that the powder is blown up from the opening by the rotation of the screw of the twin screw extruder and comes out) occurs when the material is delivered to the opening as melting or kneading of the resin is insufficient, and thus a stable operation is difficult. Moreover, it is difficult to separate the air from the material since the material containing air is hardly compressed along with the increase in an extrusion amount, and thus the vent-up (phenomenon that the material is coming out little by little from the opening) is likely to occur at the opening. As a result, a stable operation is difficult.

An object of the invention is to provide a method of manufacturing a resin kneaded product in which the extrusion amount of the material can be increased and by which the vent-up at the opening can be suppressed while the spouting out of the unmelted material at the opening can be suppressed.

Means for Solving Problem

In other words, the invention is as follows.

[1] A method of manufacturing a resin kneaded product including kneading a material containing an additive (a) and a thermoplastic resin (b) using a twin screw extruder in which the twin screw extruder includes a supply port, a discharge port, an opening present between the supply port and the discharge port, a kneading section A present between the supply port and the opening, and a kneading section B present between the opening and the discharge port, a ratio L1 (La/D) of a length La of the kneading section A to a screw diameter D satisfies L1≥3, and the material is kneaded in the kneading section A without being completely filled and the material is also kneaded in the kneading section B.

[2] The method of manufacturing a resin kneaded product according to [1], in which a ratio L2 (Lb/D) of a length Lb from the opening to a start position of the kneading section B to a screw diameter D satisfies L2≥3.

[3] The method of manufacturing a resin kneaded product according to [1] or [2] in which a screw used in the kneading section A is one or more kind of a forward kneading disk and a forward mixing screw.

[4] The method of manufacturing a resin kneaded product according to any one of [1] to [3] in which a volume average particle size of the additive (a) is from 0.6 to 100 μm.

[5] The method of manufacturing a resin kneaded product according any one of [1] to [4] in which a bulk specific gravity of the additive (a) is from 0.08 to 0.6.

[6] The method of manufacturing a resin kneaded product according any one of [1] to [5] in which the additive (a) is a flame retardant or a filler.

[7] The method of manufacturing a resin kneaded product according to [6] in which the additive (a) is a phosphate-based flame retardant.

[8] The method of manufacturing a resin kneaded product according to any one of [1] to [7] in which the thermoplastic resin (b) is a polyolefin resin or a polystyrene resin.

[9] The method of manufacturing a resin kneaded product according to any one of [1] to [8] in which the material comprises a modifier (c) for thermoplastic resin.

[10] The method of manufacturing a resin kneaded product according to [9] in which the modifier (c) for thermoplastic resin is an alkyl (meth)acrylate-based polymer.

Effect of the Invention

According to the method of manufacturing a resin kneaded product according to the invention, it is possible to increase the extrusion amount of the material and to suppress the vent-up at the opening while suppressing the spouting out of the unmelted material at the opening.

BRIEF DESCRIPTION OF DRAWINGS

FIG. 1 is a schematic diagram of a twin screw extruder used in the method according to the present embodiment.

MODE(S) FOR CARRYING OUT THE INVENTION

The present inventors have conducted intensive investigations on the melt-kneading conditions and the screw design of a twin screw extruder to perform the melt-kneading in order to achieve the above object and have found out that it is significantly effective to manufacture a resin kneaded product under a specific condition as a result, whereby the invention has been completed.

The method of manufacturing a resin kneaded product according to the invention is a method of manufacturing a resin kneaded product including kneading a material containing an additive (a) and a thermoplastic resin (b) using a twin screw extruder in which the twin screw extruder is equipped with a supply port, a discharge port, an opening present between the supply port and the discharge port, a kneading section A present between the supply port and the opening, and a kneading section B present between the opening and the discharge port, a ratio L1 (La/D) of a length La of the kneading section A to a screw diameter D satisfies L1≥3, and the material is kneaded in the kneading section A without being completely filled and the material is also kneaded in the kneading section B.

According to the invention, it is possible to solve the problem in the extrusion of a material containing a large amount of fine powder at the time of manufacturing a resin kneaded product even using a general melt-kneading twin screw extruder. In other words, it is possible to increase the extrusion amount by not allowing the air contained in a fine powder to flow backward to a supply port of a twin screw extruder but releasing the air through an opening provided downstream the supply port. Moreover, it is possible to achieve the elimination of the spouting out of the unmelted material and the vent-up through the opening due to an increase in the extrusion amount.

(Additive (a))

The additive (a) is not particularly limited, and examples thereof may include an inorganic additive such as a flame retardant, a pigment, a filler, and an auxiliary flame retardant. Among them, a flame retardant or a filler which often has a fine powder shape is preferable since the method according to the invention is more effective in the case of such a flame retardant or filler. One kind of these additives (a) may be used singly or two or more kinds thereof may be used concurrently.

Examples of the flame retardant may include a phosphate-based flame retardant, a metal hydroxide-based flame retardant, a nitrogen-based flame retardant, a silicone-based flame retardant, and a hindered amine-based flame retardant.

Examples of the phosphate-based flame retardant may include a flame retardant containing ammonium phosphate or the like as a main component. Examples of a commercially available product thereof may include "ADK STAB FP-2100J", "ADK STAB FP-2200", and "ADK STAB FP-2200S" (trade name, manufactured by ADEKA CORPORATION); and "FIRE CUT P770" (trade name, manufactured by SUZUHIRO CHEMICAL CO., LTD.). Examples of the metal hydroxide-based flame retardant may include a flame retardant containing magnesium hydroxide as a main component, a flame retardant containing aluminum hydroxide as a main component, and a mixture thereof. Examples of the nitrogen-based flame retardant may include a flame retardant containing melamine cyanurate as a main component. Examples of the silicone-based flame retardant may include a silicone resin-based flame retardant having a crosslinked structure. Examples of the hindered amine-based flame retardant may include a hindered amine compound having a NOR structure.

One kind of these flame retardants may be used singly or two or more kinds thereof may be used concurrently. Among these flame retardants, a phosphate-based flame retardant is more preferable in terms of excellent dispersibility in the thermoplastic resin (b).

The pigment is not particularly limited as long as the pigment is generally used as a pigment of a polyolefin resin. Examples of the pigment may include an organic pigment such as an azo-based pigment, a phthalocyanine-based pigment, a quinacridone-based pigment, a dioxazine-based pigment, a perylene-based pigment, and an isoindolinone-based pigment and an inorganic pigment such as titanium dioxide, red iron, red lead, carbon black, iron black, ultramarine, and cobalt blue. One kind of these pigments may be used singly or two or more kinds thereof may be used concurrently.

Examples of the filler may include talc, calcium carbonate, glass fibers, carbon fibers, magnesium carbonate, mica, kaolin, calcium sulfate, barium sulfate, titanium white, white carbon, carbon black, magnesium hydroxide, and aluminum hydroxide. Examples of talc may include "GENERAL PURPOSE TALC MS" (trade name, manufactured by Nippon Talc Co., Ltd.). One kind of these fillers may be used singly or two or more kinds thereof may be used concurrently.

Examples of the auxiliary flame retardant may include a metal oxide such as zinc oxide; a hydroxyl group-containing compound such as pentaerythritol. One kind of these auxiliary flame retardants may be used singly or two or more kinds thereof may be used concurrently.

The volume average particle size of the additive (a) is preferably 100 μm or less since the method according to the invention is more effective in this range. The volume average particle size of the additive (a) is more preferably 75 μm or less and still more preferably 50 μm or less. In addition, the bulk specific gravity of the additive (a) is preferably 0.6 or less since the method according to the invention is more effective in this range. The bulk specific gravity of the additive (a) is more preferably 0.55 or less and still more preferably 0.5 or less. The air is easily enclosed into a twin screw extruder at the time of supplying the material to the supply port of the twin screw extruder and remains inside the twin screw extruder as the volume average particle size and the bulk specific gravity of the additive (a) is smaller, and thus it is difficult to increase the extrusion amount. As a result, the method according to the invention is more effective in this case. However, the volume average particle size of the additive (a) is preferably 0.6 μm or more since the fall velocity of the additive is significantly slow in a case in which the volume average particle size of the additive (a) is less than 0.6 μm. In addition, the bulk specific gravity of the additive (a) is preferably 0.08 or more since a large amount of air is enclosed in a case in which the bulk specific gravity of the additive (a) is less than 0.08.

Meanwhile, the volume average particle size is a value measured by a laser diffraction method using the SALD-2100J MODEL (product name, manufactured by Shimadzu Corporation). In addition, the bulk specific gravity is a value measured using the bulk specific gravity measuring instrument (product name, TSUTSUI SCIENTIFIC INSTRUMENTS CO., LTD.).

The method according to the invention is particularly effective in a case in which the additive (a) does not melt at an extrusion temperature. This is because it tends to be difficult to increase the extrusion amount since the air enclosed at the time of supplying the material is hardly separated and released through the opening in a case in which the additive (a) does not melt inside a twin screw extruder. The extrusion temperature indicates the set temperature of the barrel of a twin screw extruder and can be appropriately set depending on the melting temperature of the thermoplastic resin (b) or a modifier (c) for thermoplastic resin to be described below.

(Thermoplastic Resin (b))

As the thermoplastic resin (b), a known thermoplastic resin can be used. Examples thereof may include a polyolefin resin such as polypropylene and polyethylene, a polystyrene resin, a polycarbonate resin, a polyacetal resin, a polyester resin, and a polyamide resin. Among these resins, a polyolefin resin or polystyrene resin exhibiting a high combined effect with the additive (a) is preferable, and a polyolefin resin is preferable among them. The shape of the thermoplastic resin (b) is preferably a pellet having a cylindrical shape and a total length of from 2 to 10 mm in terms of being sufficiently kneaded with the additive (a) in a fine powder state.

Examples of the polyolefin resin may include polypropylene (PP), high density polyethylene (HDPE), low density polyethylene (LDPE), linear low density polyethylene (LLDPE), poly-1-butene, polyisobutylene, a random copolymer or block copolymer of ethylene-propylene, a random copolymer or block copolymer of ethylene-propylene-1-butene, ethylene-propylene-diene terpolymer, a copolymer of ethylene or propylene and cyclopentadiene, and a random copolymer, a block copolymer, or a graft polymer obtained by adding 50% by mass or less of for example, a vinyl monomer such as vinyl acetate, a methacrylic acid ester, an acrylic acid ester, or an aromatic vinyl monomer to ethylene or propylene. One kind of these thermoplastic resins (b) may be used singly or two or more kinds thereof may be used concurrently.

(Modifier (c) for Thermoplastic Resin)

In the method according to the invention, the material to be kneaded in a twin screw kneader preferably further contains a modifier (c) for thermoplastic resin other than the additive (a) and the thermoplastic resin (b). The modifier (c) for thermoplastic resin is a modifier to impart an additional function to the thermoplastic resin (b). As the modifier (c) for thermoplastic resin, a known modifier for thermoplastic resin can be used. Examples of the modifier (c) for thermoplastic resin may include a dispersant, a crystal nucleating agent, a stabilizer, and a lubricant. One kind of these modifiers (c) for thermoplastic resin may be used singly or two or more kinds thereof may be used concurrently.

Examples of the dispersant may include an alkyl (meth) acrylate-based polymer, an acid-modified polyolefin resin, and an acid-modified wax. An alkyl (meth)acrylate-based polymer is preferable from the viewpoint of dispersibility improving ability. Examples of the alkyl (meth)acrylate-based polymer may include a copolymer having one kind or two or more kinds of monomers such as methyl (meth)acrylate, ethyl (meth)acrylate, propyl (meth)acrylate, n-butyl (meth)acrylate, iso-butyl (meth)acrylate, t-butyl (meth)acrylate, n-hexyl (meth)acrylate, cyclohexyl (meth)acrylate, and 2-ethylhexyl (meth)acrylate as a main component. Among these, an alkyl (meth)acrylate-based polymer having an alkyl group having 4 carbon atoms is preferable and an iso-butyl (meth)acrylate-based polymer is more preferable. One kind of these may be used singly or two or more kinds thereof may be used concurrently. Meanwhile, the "(meth)acrylate" denotes the "acrylate or methacrylate" in the present specification.

The crystal nucleating agent is not particularly limited as long as an agent is generally used as a crystal nucleating agent of a polyolefin resin. Examples of the crystal nucleating agent may include a sorbitol-based compound described below.

Examples of the sorbitol-based compound may include 1.3,2.4-dibenzylidenesorbitol, 1.3,2.4-bis(4-methylbenzylidene)sorbitol, 1.3,2.4-bis(4-ethylbenzylidene)sorbitol, 1.3,2.4-bis(2',4'-dimethylbenzylidene)sorbitol, methylbenzylidene)-2.4-benzylidene sorbitol, 1.3-(2',4'-dimethylbenzylidene)-2.4-benzylidene sorbitol, 1.3-benzylidene-2.4-(2',4'-dimethylbenzylidene)sorbitol, 1.3,2.4-bis(3',4'-dimethylbenzylidene)sorbitol, and 1.3-(4-chlorobenzylidene)-2.4-(4-methylbenzylidene)sorbitol. One kind of these may be used singly or two or more kinds thereof may be used in combination.

Examples of the stabilizer may include a phenolic antioxidant such as pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate]; a phosphorus-based antioxidant such as tris(mono-nonylphenyl)phosphite and tris(2,4-di-t-butylphenyl) phosphite; a sulfur-based antioxidant such as dilauryl thiodipropionate; a hindered amine-based light stabilizer such as "TINUVIN-770" (trade name, manufactured by Ciba Japan K.K.) and "ADK STAB LA-57" (trade name, manufactured by ADEKA CORPORATION); and a ultraviolet absorber such as "TINUVIN 1577FF" (trade name, manufactured by Ciba Japan K.K.) and "ADK STAB LA-32" (trade name, manufactured by ADEKA CORPORATION). One kind of these stabilizers may be used singly or two or more kinds thereof may be used concurrently.

Examples of the lubricant may include a sodium salt, a calcium salt or a magnesium salt of lauryl acid, palmitic acid, oleic acid, or stearic acid. One kind of these lubricants may be used singly or two or more kinds thereof may be used concurrently.

In addition, as the modifier (c) for thermoplastic resin, a modifier which is meltable at an extrusion temperature is preferable. This is because it is difficult to separate the air that is enclosed at the time of supplying the material and release through the opening in a case in which the modifier (c) for thermoplastic resin does not melt inside a twin screw extruder.

(Material)

The material of the invention contains the additive (a), the thermoplastic resin (b), and if necessary, the modifier (c) for thermoplastic resin. The material is supplied to a twin screw extruder.

The composition ratio of the additive (a), the thermoplastic resin (b), and the modifier (c) for thermoplastic resin in the material can be appropriately set depending on the kind of the additive (a), the thermoplastic resin (b), and the modifier (c) for thermoplastic resin or the extent of demand thereon. As the composition ratio, it is preferable that the content of the additive (a) is from 50 to 95% by mass, the content of the thermoplastic resin (b) is 50 to 5% by mass, and the content of the modifier (c) for thermoplastic resin is from 0 to 45% by mass in the total 100% by mass of the additive (a), the thermoplastic resin (b), and the modifier (c) for thermoplastic resin. It is more preferable that the content of the additive (a) is from 55 to 90% by mass, the content of the thermoplastic resin (b) is 45 to 10% by mass, and the content of the modifier (c) for thermoplastic resin is from 0 to 20% by mass. It is still more preferable that the content of the additive (a) is from 60 to 80% by mass, the content of the thermoplastic resin (b) is 40 to 20% by mass, and the content of the modifier (c) for thermoplastic resin is from 0 to 10% by mass. The composition ratio is particularly preferably that the content of the additive (a) is from 65 to 75% by mass, the content of the thermoplastic resin (b) is 35 to 25% by mass, and the content of the modifier (c) for thermoplastic resin is from 0 to 10% by mass.

Meanwhile, a problem of entering of the material in the supply section is likely to occur when the content of the additive (a) is high in a case in which the additive (a) has a fine powder shape. In addition, the operation of extrusion is facilitated when the content of the additive (a) is 95% by mass or less in a case in which the additive (a) is a material that does not melt at an extrusion temperature.

The material may contain a plasticizer, an antistatic agent, an antibacterial agent, a deodorant, a deodorizer, or a mixture thereof other than the additive (a), the thermoplastic resin (b), and the modifier (c) for thermoplastic resin.

(Kneading Method)

Kneading in the invention indicates kneading using a twin screw extruder as described below, and the resin kneaded product indicates a kneaded product obtained by kneading a material.

The twin screw extruder used in the method according to the invention will be explained. Examples of the twin screw extruder may include a co-rotating type, a counter-rotating type, and an incomplete intermeshing type, and a co-rotating twin screw extruder is preferable from the viewpoint of excellent extrusion ability. Examples of the co-rotating type may include a single-start thread type, a double-start thread type, and a triple-start thread type. Examples of the counter-rotating type may include a parallel shaft type and an inclined shaft type.

The schematic diagram of a twin screw extruder of an embodiment of the invention is illustrated in FIG. 1. Meanwhile, the twin screw extruder according to the invention is not limited thereto.

The twin screw extruder illustrated in FIG. 1 is equipped with a supply port 1 for supplying the material, a discharge port 2 for discharging the resin kneaded product kneaded inside the twin screw extruder, and an opening 3 present between the supply port 1 and the discharge port 2. The twin screw extruder illustrated in FIG. 1 is equipped with one opening 3 but may be equipped with two or more openings 3. In that case, all of the openings are regarded as the opening 3, respectively.

The material is likely to blow up through the opening 3 since the opening 3 suddenly becomes an open state when the material reaches the opening 3 in an unmelted state or a state in which the additive (a), the thermoplastic resin (b), and the modifier (c) for thermoplastic resin added if necessary are not sufficiently melted and mixed. Hence, it is impossible to separate and discharge the air only even if the material in the barrel reaches the opening 3 in a completely unmelted state. The material is desired to be melted and mixed to a certain extent before reaching the opening 3 in order to separate and discharge the air only. This problem occurs at the opening 3 closest to the supply port 1 particularly in a case in which there are plural openings 3. The opening 3 may be an atmospheric open type or a vacuum drawing type, but the opening 3 closest to the supply port 1 is preferably an atmospheric open type.

In addition, the twin screw extruder illustrated in FIG. 1 is equipped with a kneading section A between the supply port 1 and the opening 3 in order to melt and mix the material to a certain extent before the material reaches the opening 3. The kneading section A refers to the part where a screw having kneading ability such as a kneading disk is present. The screw having kneading ability indicates a screw capable of kneading the material mainly by a shearing action. Meanwhile, the twin screw extruder illustrated in FIG. 1 is equipped with one kneading section A but may be equipped with two or more kneading sections A. It is desirable to dispose the kneading sections A between the opening 3 closest to the supply port 1 side and the supply port 1 in a case in which plural openings 3 and plural kneading sections are equipped. This is because the unmelted material spouts out through the opening 3 closest to the supply port 1 side in a case in which the kneading section A is not disposed between the opening 3 closest to the supply port 1 side and the supply port 1. For this reason, one or more kneading sections disposed between the opening 3 closest to the supply port 1 side and the supply port 1 are regarded as the kneading section A in a case in which plural openings 3 and plural kneading sections are equipped.

Kneading of material in the invention is performed without completely filling the material in the kneading section A provided between the supply port 1 and the opening 3. Hence, it is preferable to adopt the combination of screws having a feeding action by which the material is not completely filled in the kneading section A. The complete filling described here refers to a state in which the filling rate (ε) defined as the volume ratio of the material to the interior space of the extruder is 1. At this time, the filling rate can be dealt in the same manner even the material is a solid, a melt, or in a mixed state thereof. The screw is preferably selected such that $\epsilon < 1$ in the kneading section A.

In addition, it is preferable to perform melting or kneading without providing a pressure rising area in which a strong compression is applied with respect to the material in addition to not providing the area in which the material is completely filled in the kneading section A. This is because there is a case in which the air does not come to the opening 3 but flows backward to the supply port 1, the material cannot be supplied to the supply port 1, and thus reduction in the extrusion amount (feed-neck phenomenon) occurs when the area in which the material is completely filled or the pressure rising area is present. Meanwhile, a case in which the material is partially expanded by heating and thus the inside of the screw is substantially completely filled with the material is also regarded as the complete filling.

For this reason, the screw used in the kneading section A preferably consists of a screw exhibiting a kneading action in the forward direction with respect to the extrusion direction. This is because there is a case in which the material is completely filled when a screw exhibiting a kneading action in the backward or neutral direction with respect to the extrusion direction is used. The screw exhibiting a kneading action in the forward direction with respect to the extrusion direction indicates a screw exhibiting a kneading action to convey the material in the extrusion direction when the screw is rotated. As a representative screw, a forward kneading disk or a forward mixing screw may be exemplified. In particular, a forward kneading disk is preferably used.

In the invention, $L1 \geq 3$ from the viewpoint of sufficient melting of the material when the ratio La/D of the length La of the kneading section A to a screw diameter D is set to L1. It is preferable that $L1 \geq 4$ and it is more preferable that $L1 \geq 6$. In addition, it is preferable that $100 \geq L1$, it is more preferable that $50 \geq L1$, it is still more preferable that $30 \geq L1$, and it is particularly preferable that $20 \geq L1$. The manufacturing cost of the device increases and the installation space for the device is required when L1 is too long. Provided that, the total length of the plural kneading sections A is set to La in a case in which plural kneading sections A are equipped. In addition, the screw diameter D is the same size in the entire two screw extruder, and the screw diameters of two screws are also the same size.

In a case in which L1 is out of the range described above, the unmelted material spouts out through the opening 3 and even the vent-up occurs when the extrusion amount of the material is increased, and thus it is difficult to perform a continuous and stable manufacture of the resin kneaded product.

Moreover, the twin screw extruder illustrated in FIG. 1 is equipped with a kneading section B present between the opening 3 and the discharge port 2 in order to sufficiently knead the material. The kneading section B refers to the part where a screw having kneading ability such as a kneading disk is present. As the screw used in the kneading section B, a plurality of kneading disks and the like can be used in combination. It is possible to select a screw which can sufficiently knead the material since the increase or decrease in the extrusion amount is not affected by the fact that the material is completely filled or not completely filled in the kneading section B. Examples of the screw used in the kneading section B may include a screw in which a forward, a neutral, and a backward kneading disks and mixing screws, a rotary screw, and the like are combined. Meanwhile, the twin screw extruder illustrated in FIG. 1 is equipped with one kneading section B but may be equipped with two or more kneading sections B. One or more kneading sections disposed between the opening 3 closest to the supply port 1 side and the discharge port 2 are regarded as the kneading section B in a case in which plural openings 3 and plural kneading sections are equipped. In this case, the location for disposing the kneading section B is not particularly limited as long as the location is between the opening 3 closest to the supply port 1 side and the discharge port 2.

It is preferable that $L3 \geq 5$ from the viewpoint of sufficient kneading of the material when the ratio Lc/D of the length Lc of the kneading section B to the screw diameter D is set to L3. In addition, it is more preferable that $L3 \geq 5$ which is obtained by combining a forward, a neutral, and a backward kneading disks. Further, it is more preferable that $L3 \geq 7$. In addition, it is preferable that $100 \geq L3$, it is more preferable that $50 \geq L3$, it is still more preferable that $30 \geq L3$, and it is particularly preferable that L3. The manufacturing cost of the device increases and the installation space for the device is required when L3 is too long. Provided that, the total length of the plural kneading sections B is set to Lc in a case in which plural kneading sections B are equipped.

A screw having kneading ability is disposed in the kneading section B. The position of the screw having kneading ability closest to the supply port 1, that is, the position where the material first comes into the kneading section B is defined as the start position of the kneading section B.

In the invention, it is preferable that $L2 \geq 3$ from the viewpoint of preventing the vent-up at the opening 3 when the ratio Lb/D of the length Lb from the opening 3 to the start position of the kneading section B to the screw diameter D is set to L2. It is more preferable that $L2 \geq 6$ and it is still more preferable that $L2 \geq 10$. In addition, it is preferable that $100 \geq L2$, it is more preferable that $50 \geq L2$, it is still more preferable that $30 \geq L2$, and it is particularly preferable that $20 \geq L2$. The manufacturing cost of the device increases and the installation space for the device is required when L2 is too long. Meanwhile, the length Lb from the opening 3 to the start position of the kneading section B indicates the length from the end position of the opening 3 to the start position of the kneading portion B5 with respect to the proceeding direction of the resin since the opening 3 has a certain length. In addition, the length between the start position of the kneading section B closest to the opening 3 and the opening 3 is set to Lb in a case in which one opening 3 and plural kneading sections B are equipped. In addition, the length between the start position of the kneading section B closest to the opening 3 closest to the supply port 1 side and the opening 3 closest to the supply port 1 side is set to Lb in a case in which plural openings 3 and plural kneading sections B are equipped.

A screw not having kneading action is selected as the screw for the part other than the kneading section A and the kneading section B of the twin screw extruder. A forward full flight screw may be exemplified as a representative screw.

The extrusion temperature can be appropriately set depending on the kind of the additive (a), the thermoplastic resin (b), and the modifier (c) for thermoplastic resin added if necessary. The extrusion temperature at which the thermoplastic resin (b), and the modifier (c) for thermoplastic resin added if necessary are meltable is preferably from 160 to 280° C. and more preferably from 180 to 240° C. The extrusion temperature may be set to the same temperature in the entire twin screw extruder or partially changed. In addition, the raw material supply port for supplying the material to the supply port 1 is preferably in a cooled state since there is a case in which the material is melted at the supply port 1 and thus the supply of the material is impossible. Specifically, the temperature thereof is preferably set to 10 to 30° C. at which the thermoplastic resin (b) does not melt.

The resin kneaded product discharged from the discharge port 2 of the twin screw extruder can be subjected to an appropriate treatment if necessary. The resin kneaded product may be discharged in a certain shape and then cooled and crushed, or a general pelleting means may be adopted. The resin kneaded product is preferably formed into a pellet shape in the case of using as a master batch. The method of forming into a pellet shape is not particularly limited, and the resin composition is preferably extruded in a strand shape from the die and the strand is cut in an appropriate length.

The resin kneaded product manufactured by the method according to the invention can be used in a sheet material such as an optical sheet, a film material such as a food film, an automobile member, a home appliance member, a medical member, a building member, or the like.

EXAMPLES

Hereinafter, the invention will be described specifically with reference to Examples, but the invention is not limited thereto.

Example 1-1

Preparation of Modifier (c) for Thermoplastic Resin

Into a separable flask equipped with a thermometer, a nitrogen inlet tube, a cooling tube, and a stirrer, 225 parts of ion exchanged water, 2.5 parts of sodium dodecylbenzenesulfonate and 0.0002 part of iron (II) sulfate as an emulsifier, 0.0006 part of disodium ethylenediaminetetraacetate, and 0.48 part of ascorbic acid were introduced, and the inside of the flask was purged with nitrogen. Subsequently, the internal temperature of the flask was raised to 73° C., and a monomer mixture of 0.2 part of cumene hydroperoxide as a polymerization catalyst, 98 parts of isobutyl methacrylate containing 1.0 part of n-octyl mercaptan as a chain transfer agent, and 2 parts of n-butyl acrylate was added thereto dropwise over 1 hour. Further, the resultant was held for 1 hour at the same temperature to obtain an alkyl (meth)acrylate-based polymer latex. The mass average molecular weight of this latex was 30,000.

The latex was cooled to room temperature and added dropwise into warm water containing 5 parts of calcium acetate at 70° C. Thereafter, the resultant was coagulated by heating to 90° C. The coagulated product thus obtained was separated, washed, and then dried for 12 hours at 60° C. to obtain a modifier. The modifier is referred to as the "dispersant (1)".

(Manufacture of Resin Kneaded Product)

As the additive (a), a phosphate-based flame retardant "ADK STAB FP-2100J" (trade name, manufactured by ADEKA CORPORATION, and having a volume average particle size of 10 μm or less, a bulk specific gravity of from 0.3 to 0.5, no melting point) (hereinafter, referred to as the "flame retardant") was used. As the thermoplastic resin (b), a polypropylene resin pellet "Novatec PP FL203D" (trade name, manufactured by Japan Polypropylene Corporation, and having a melt flow rate of 3 g/10 min) (hereinafter, referred to as "PP") was used. As the modifier (c) for thermoplastic resin, the dispersant (1) described above was used.

The additive (a), the thermoplastic resin (b), and the modifier (c) for thermoplastic resin were supplied to the supply port 1 of the twin screw extruder illustrated in FIG. 1 using a feeder while controlling and kneaded. Meanwhile, the supply amounts of the respective materials were as follows. The additive (a) was 70% by mass, the thermoplastic resin (b) was 20% by mass, and the modifier (c) for thermoplastic resin was 10% by mass.

As the twin screw extruder, a co-rotary twin screw extruder TEM-26SS (product name, manufactured by TOSHIBA MACHINE CO., LTD., and having a screw diameter D of 26 mm and L/D of 64.6) was used. The twin screw extruder is equipped with the basic configuration illustrated in FIG. 1 of supply port 1-kneading section A-opening 3-kneading section B-discharge port 2.

As the feeder (1) to the supply port 1, the "CE-T-1 Model" (model name, manufactured by Kubota Corporation) was used. The additive (a) and the modifier (c) for thermoplastic resin were supplied to the feeder (1). The additive (a) and the modifier (c) for thermoplastic resin were hand blended in advance at a predetermined ratio and then supplied at the time of introducing the materials to the feeder (1).

As the feeder (2) to the supply port 1, the "ALS-254" (model name, manufactured by INDUSTRIAL MECHATRONICS CO., LTD.) was used. The thermoplastic resin (b) was supplied to the feeder (2).

The temperature of the cylinder installed with the supply port 1 was set to 30° C. and the temperature of the other cylinders was set to 180° C. The temperature of the head was set to 180° C. The rotation speed of the screw was set to 200 rpm.

The details of the respective screw elements that constitute the screw block are presented in Table 1.

TABLE 1

| Symbol | Screw element type | L/D | Length (mm) | Number of discs | Angle of torsion (°) |
| --- | --- | --- | --- | --- | --- |
| R1 | Forward kneading disk | 1 | 27 | 7 | 30 |
| R2 | Forward kneading disk | 1 | 27 | 5 | 45 |
| R3 | Forward kneading disk | 0.75 | 20 | 5 | 45 |
| N | Neutral kneading disk | 1 | 27 | 7 | 90 |
| L | Backward kneading disk | 1 | 27 | 7 | 30 |
| F | Forward full flight disk screw | 0.75 to 1.5 | 20 to 40 | — | — |

Here, the screw elements R1, R2, R3, and F are screws that are not completely filled, and the screw elements N and L are screws that are completely filled.

In the present Example, the screw block in the kneading section A was constituted by R1·R1·R1·R1·R1·R1·R3 (order close to the supply port 1 from the left). The screw block in the kneading section B was constituted by R2·R2·N·L·L (order close to the supply port 1 from the left). Sufficient kneading of the material was secured by the combination of forward kneading disk.neutral kneading disk.backward kneading disk. Meanwhile, a forward full flight screw (F) was used for the screw block other than the kneading section A and the kneading section B.

The values of L1, L2, and L3 were as follows. L1=6.75, L2=4, and L3=5.

(Spouting Out of Material at Opening 3)

The spouting out of the material at the opening 3 was evaluated according to the following criteria.

A: the material is in a state in which the material is melted and united at the opening 3 and does not spout out through the opening 3, and thus a stable operation is possible.

B: part of the material is present in an unmelted state at the opening 3 and the material spouts out through the opening 3.

(Vent-Up at Opening 3)

The vent-up at the opening 3 was evaluated according to the following criteria.

A: vent-up is not observed at the opening 3 for 5 minutes or longer after a predetermined extrusion condition is achieved and thus a stable operation is possible.

B: vent-up is observed at the opening 3 in less than 5 minutes after a predetermined extrusion condition is achieved.

The operative conditions of the present Example are presented in Table 2. In addition, the evaluation results of the spouting out of the material at the opening 3, the vent up at the opening 3, and the total throughput are presented in Table 3. Meanwhile, the total throughput refers to the sum of the amounts of the additive (a), the thermoplastic resin (b), and the modifier (c) for thermoplastic resin supplied to the twin screw extruder per unit time.

Example 2-1

Example 2-1 was performed in the same manner as Example 1-1 except that the screw block in the kneading section A was constituted by R1·R1·R1·R1·R1·R1 (order close to the supply port 1 from the left), and L1=6 and L2=6. The operative conditions and the evaluation results are presented in Table 2 and Table 3, respectively.

Example 3-1

Example 3-1 was performed in the same manner as Example 1-1 except that L2=10. The operative conditions and the evaluation results are presented in Table 2 and Table 3, respectively.

Example 3-2

Example 3-2 was performed in the same manner as Example 3-1 except that the modifier (c) for thermoplastic resin was not used and the supply amount of the thermoplastic resin (b) was set to 30% by mass. The operative conditions and the evaluation results are presented in Table 2 and Table 3, respectively.

Example 4-1

Example 4-1 was performed in the same manner as Example 3-2 except that a polystyrene resin pellet "Toyo Styrol GP G200C" (manufactured by TOYO-STYRENE CO., LTD. and having a melt flow rate of 8.5 g/10 min) (hereinafter, referred to as "PS") was used as the thermoplastic resin (b), and the supply amount of the additive (a) and the thermoplastic resin (b) were set to 66% by mass and 34% by mass, respectively. The operative conditions and the evaluation results are presented in Table 2 and Table 3, respectively.

Example 5-1

Example 5-1 was performed in the same manner as Example 3-2 except that a filler "GENERAL PURPOSE TALC MS" (trade name, manufactured by Nippon Talc Co., Ltd., and having a volume average particle size of 14 μm, a bulk specific gravity of 0.35, and a melting point of 1500° C.) (hereinafter, referred to as "Talc") was used as the additive (a). The operative conditions and the evaluation results are presented in Table 2 and Table 3, respectively.

Example 5-2

Example 5-2 was performed in the same manner as Example 5-1 except that the supply amounts of the additive (a) and the thermoplastic resin (b) were set to 80% by mass and 20% by mass, respectively. The operative conditions and the evaluation results are presented in Table 2 and Table 3, respectively.

Example 5-3

Example 5-3 was performed in the same manner as Example 5-1 except that the supply amount of the thermoplastic resin (b) was set to 25% by mass, and 5% by mass of the dispersant (1) was supplied as the modifier (c) for thermoplastic resin. The operative conditions and the evaluation results are presented in Table 2 and Table 3, respectively.

Example 6-1

Example 6-1 was performed in the same manner as Example 5-1 except that the supply amount of the additive (a) was set to 66% by mass, and 34% by mass of PS was supplied as the thermoplastic resin (b). The operative conditions and the evaluation results are presented in Table 2 and Table 3, respectively.

Example 6-2

Example 6-2 was performed in the same manner as Example 5-1 except using PS as the thermoplastic resin (b). The operative conditions and the evaluation results are presented in Table 2 and Table 3, respectively.

Example 6-3

Example 6-3 was performed in the same manner as Example 6-1 except that the supply amount of the additive (a) and the thermoplastic resin (b) was set to 80% by mass and 20% by mass, respectively. The operative conditions and the evaluation results are presented in Table 2 and Table 3, respectively.

Example 7-1

Example 7-1 was performed in the same manner as Example 6-2 except that the screw block in the kneading section A was constituted by R1.R1.R1.R1 (order close to the supply port 1 from the left), and L1=4. The operative conditions and the evaluation results are presented in Table 2 and Table 3, respectively.

Comparative Example 1

Comparative Example 1 was performed in the same manner as Example 5-1 except that the screw block in the kneading section A was constituted by R3, and L1=0.75 and L2=2. The operative conditions and the evaluation results are presented in Table 2 and Table 3, respectively.

Comparative Example 2

Comparative Example 2 was performed in the same manner as Example 5-1 except that the screw block in the kneading section A was constituted by R3, and L1=0.75. The operative conditions and the evaluation results are presented in Table 2 and Table 3, respectively.

TABLE 2

| | Additive (a) | | Thermoplastic resin (b) | | Modifier (c) for thermoplastic resin | | Screw block | | | | |
|---|---|---|---|---|---|---|---|---|---|---|---|
| | Kind | Supply amount (% by mass) | Kind | Supply amount (% by mass) | Kind | Supply amount (% by mass) | Kneading section A | Kneading section B | L1 | L2 | L3 |
| Example 1-1 | Flame retardant | 70 | PP | 20 | Dispersant (1) | 10 | R1·R1·R1·R1·R1·R1·R3 | R2·R2·N·L·L | 6.75 | 4 | 5 |
| Example 2-1 | Flame retardant | 70 | PP | 20 | Dispersant (1) | 10 | R1·R1·R1·R1·R1·R1 | R2·R2·N·L·L | 6 | 6 | 5 |
| Example 3-1 | Flame retardant | 70 | PP | 20 | Dispersant (1) | 10 | R1·R1·R1·R1·R1·R1·R3 | R2·R2·N·L·L | 6.75 | 10 | 5 |
| Example 3-2 | Flame retardant | 70 | PP | 30 | — | — | R1·R1·R1·R1·R1·R1·R3 | R2·R2·N·L·L | 6.75 | 10 | 5 |
| Example 4-1 | Flame retardant | 66 | PS | 34 | — | — | R1·R1·R1·R1·R1·R1·R3 | R2·R2·N·L·L | 6.75 | 10 | 5 |
| Example 5-1 | Talc | 70 | PP | 30 | — | — | R1·R1·R1·R1·R1·R1·R3 | R2·R2·N·L·L | 6.75 | 10 | 5 |
| Example 5-2 | Talc | 80 | PP | 20 | — | — | R1·R1·R1·R1·R1·R1·R3 | R2·R2·N·L·L | 6.75 | 10 | 5 |
| Example 5-3 | Talc | 70 | PP | 25 | Dispersant (1) | 5 | R1·R1·R1·R1·R1·R1·R3 | R2·R2·N·L·L | 6.75 | 10 | 5 |
| Example 6-1 | Talc | 66 | PS | 34 | — | — | R1·R1·R1·R1·R1·R1·R3 | R2·R2·N·L·L | 6.75 | 10 | 5 |
| Example 6-2 | Talc | 70 | PS | 30 | — | — | R1·R1·R1·R1·R1·R1·R3 | R2·R2·N·L·L | 6.75 | 10 | 5 |
| Example 6-3 | Talc | 80 | PS | 20 | — | — | R1·R1·R1·R1·R1·R1·R3 | R2·R2·N·L·L | 6.75 | 10 | 5 |
| Example 7-1 | Talc | 70 | PS | 30 | — | — | R1·R1·R1·R1 | R2·R2·N·L·L | 4 | 10 | 5 |
| Comparative Example 1 | Talc | 70 | PP | 30 | — | — | R3 | R2·R2·N·L·L | 0.75 | 2 | 5 |
| Comparative Example 2 | Talc | 70 | PP | 30 | — | — | R3 | R2·R2·N·L·L | 0.75 | 10 | 5 |

TABLE 3

| | Spouting out of material at opening 3 | Vent-up at opening 3 | Total throughput [kg/h] |
|---|---|---|---|
| Example 1-1 | A | A | 18 |
| Example 2-1 | A | A | 20 |
| Example 3-1 | A | A | 20 |
| Example 3-2 | A | A | 20 |
| Example 4-1 | A | A | 18 |
| Example 5-1 | A | A | 20 |
| Example 5-2 | A | A | 20 |
| Example 5-3 | A | A | 20 |
| Example 6-1 | A | A | 18 |
| Example 6-2 | A | A | 18 |
| Example 6-3 | A | A | 17 |
| Example 7-1 | A | A | 17 |
| Comparative Example 1 | B | B | 8 |
| Comparative Example 2 | B | B | 8 |

It was possible to operate at a high throughput in all Examples as the problem of the spouting out of the material at the opening 3 and the vent-up did not occur. Consequently, it has been found out that the problem of the spouting out of the unmelted material from the opening 3 and the vent-up associated with an increase in the extrusion amount can be solved according to the method of manufacturing a resin kneaded product according to the invention.

On the other hand, in Comparative Examples 1 and 2, melting and kneading of the material was insufficient, the unmelted material spouted out at the opening 3, and vent-up also occurred since the screw constitution did not satisfy the condition of L1≥3. For this reason, it was difficult to perform the operation continuously and stably by increasing the throughput.

EXPLANATIONS OF LETTERS OR NUMERALS

1 Supply port
2 Discharge port
3 Opening
4 Kneading section A
5 Kneading section B

The invention claimed is:

1. A method of manufacturing a resin kneaded product comprising;
    kneading a material including an additive (a) and a thermoplastic resin (b) using a twin screw extruder, wherein
    the twin screw extruder includes a supply port, a discharge port, an opening present between the supply port and the discharge port, a kneading section A present between the supply port and the opening, and a kneading section B present between the opening and the discharge port,
    a ratio L1 (La/D) of a length La of the kneading section A to a screw diameter D satisfies L1≥3, and the material is kneaded in the kneading section A without being completely filled and the material is also kneaded in the kneading section B.

2. The method of manufacturing a resin kneaded product according to claim 1, wherein a ratio L2 (Lb/D) of a length Lb from the opening to a start position of the kneading section B to a screw diameter D satisfies

L2≥3.

3. The method of manufacturing a resin kneaded product according to claim 1, wherein a screw used in the kneading section A is one or more kinds of a forward kneading disk and a forward mixing screw.

4. The method of manufacturing a resin kneaded product according to claim 1, wherein a volume average particle size of the additive (a) is from 0.6 to 100 μm.

5. The method of manufacturing a resin kneaded product according to claim 1, wherein a bulk specific gravity of the additive (a) is from 0.08 to 0.6.

6. The method of manufacturing a resin kneaded product according to claim 1, wherein the thermoplastic resin (b) is a polyolefin resin or a polystyrene resin.

7. The method of manufacturing a resin kneaded product according to claim 1, wherein the additive (a) is a flame retardant or a filler.

8. The method of manufacturing a resin kneaded product according to claim 7, wherein the additive (a) is a phosphate-based flame retardant.

9. The method of manufacturing a resin kneaded product according to claim 1, wherein the material comprises a modifier (c) for thermoplastic resin.

10. The method of manufacturing a resin kneaded product according to claim 9, wherein the modifier (c) for thermoplastic resin is an alkyl (meth)acrylate-based polymer.

\* \* \* \* \*